(12) United States Patent
Smith et al.

(10) Patent No.: US 9,683,644 B2
(45) Date of Patent: Jun. 20, 2017

(54) TORQUE CONVERTER WITH A COVER HAVING RECESSED FLEXPLATE CONNECTION

(71) Applicant: Schaeffler Technologies AG & Co. KG, Herzogenaurach (DE)

(72) Inventors: Matthew Smith, Wooster, OH (US); Timothy Hess, Westlake, OH (US); Drew Hilty, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/943,526

(22) Filed: Nov. 17, 2015

(65) Prior Publication Data

US 2017/0138453 A1    May 18, 2017

(51) Int. Cl.
| | |
|---|---|
| *F16D 33/18* | (2006.01) |
| *F16H 41/04* | (2006.01) |
| *F16H 45/00* | (2006.01) |
| *F16H 41/24* | (2006.01) |
| *F16H 45/02* | (2006.01) |

(52) U.S. Cl.
CPC ............ *F16H 41/04* (2013.01); *F16D 33/18* (2013.01); *F16H 41/24* (2013.01); *F16H 45/00* (2013.01); *F16H 45/02* (2013.01); *F16H 2041/243* (2013.01); *F16H 2045/0226* (2013.01); *F16H 2045/0263* (2013.01)

(58) Field of Classification Search
CPC ... F16D 33/18; F16H 41/24; F16H 2045/0221
USPC .......................................... 60/330, 338, 366
See application file for complete search history.

(56) References Cited

U.S. PATENT DOCUMENTS

| | | | |
|---|---|---|---|
| 7,353,924 B2 * | 4/2008 | Hinkel | F16H 41/24 192/3.29 |
| 7,837,018 B2 * | 11/2010 | Nakamura | F16H 45/02 192/213.21 |
| 8,376,105 B2 * | 2/2013 | Ochi | F16H 45/02 192/213.2 |
| 9,309,956 B2 * | 4/2016 | Lindemann | F16H 45/02 |
| 2011/0315498 A1 | 12/2011 | Karamavruc et al. | |

* cited by examiner

*Primary Examiner* — Michael Leslie
(74) *Attorney, Agent, or Firm* — Chester Paul Maliszewski

(57) ABSTRACT

A torque converter, including: an axis of rotation; a cover arranged to receive torque from an engine; an impeller shell fixedly secured to the cover; at least one impeller blade fixedly secured to the impeller shell; a turbine including a turbine shell and at least one turbine blade fixedly secured to the turbine shell; and an output arranged to non-rotatably connect to an input shaft for a transmission. The cover includes a plurality of indentations and a respective fastener located in each indentation and fixedly secured to the cover.

19 Claims, 6 Drawing Sheets

TORQUE CONVERTER WITH A COVER HAVING RECESSED FLEXPLATE CONNECTION

TECHNICAL FIELD

Disclosed herein is a torque converter having a cover with a recessed flexplate connection. In particular, the cover has indentions for fasteners used to connect the cover to a flexplate.

BACKGROUND

FIG. 7 is a partial cross-sectional view of prior art torque converter 200. Torque converter 200 includes cover 202 and at least one fastener 204. Fastener 204 is fixedly connected to cover 202 and flexplate 206. Flexplate 206 transmits torque to cover 202 via fasteners 204. Fastener 204 is fixed to surface 208 of cover 202, in particular, to portion 208A of surface 208, which is in the form of a continuous annular ring. Thus, fastener 204 extends axially from portion 208A.

SUMMARY

According to aspects illustrated herein, there is provided a torque converter, including: an axis of rotation; a cover arranged to receive torque from an engine, the cover including a plurality of indentations and a respective fastener located in each indentation and fixedly secured to the cover; an impeller shell fixedly secured to the cover; at least one impeller blade fixedly secured to the impeller shell; a turbine including a turbine shell and at least one turbine blade fixedly secured to the turbine shell; and an output arranged to non-rotatably connect to an input shaft for a transmission.

According to aspects illustrated herein, there is provided a torque converter, including: an axis of rotation; a cover arranged to receive torque from an engine, the cover including a first plurality of segments, a plurality of indentations, each indentation circumferentially disposed between respective first and second segments included in the first plurality of segments and a respective fastener located in said each indentation and fixedly secured to the cover; an impeller shell fixedly secured to the cover; at least one impeller blade fixedly secured to the impeller shell; a turbine including a turbine shell and at least one turbine blade fixedly secured to the turbine shell; and an output arranged to non-rotatably connect to an input shaft for a transmission. Each indentation extends further in an axial direction, defined from the at least one turbine blade toward the at least on impeller blade and parallel to the axis of rotation, than the respective first and second segments.

According to aspects illustrated herein, there is provided a torque converter, including: an axis of rotation; a cover arranged to receive torque from an engine, the cover including a first plurality of segments facing in a first axial direction and a second plurality of segments facing in the first axial direction; a plurality of indentations, each indentation formed by a respective first side wall connecting a respective first segment included in the first plurality of segments with a respective second segment included in the second plurality of segments and a respective second side wall connecting the respective first segment with a respective third segment included in the second plurality of segments; an impeller shell fixedly secured to the cover; at least one impeller blade fixedly secured to the impeller shell; a turbine including a turbine shell and at least one turbine blade fixedly secured to the turbine shell; and an output arranged to non-rotatably connect to an input shaft for a transmission.

BRIEF DESCRIPTION OF THE DRAWINGS

Various embodiments are disclosed, by way of example only, with reference to the accompanying schematic drawings in which corresponding reference characters indicate corresponding parts, in which.

DETAILED DESCRIPTION

Figure 1:
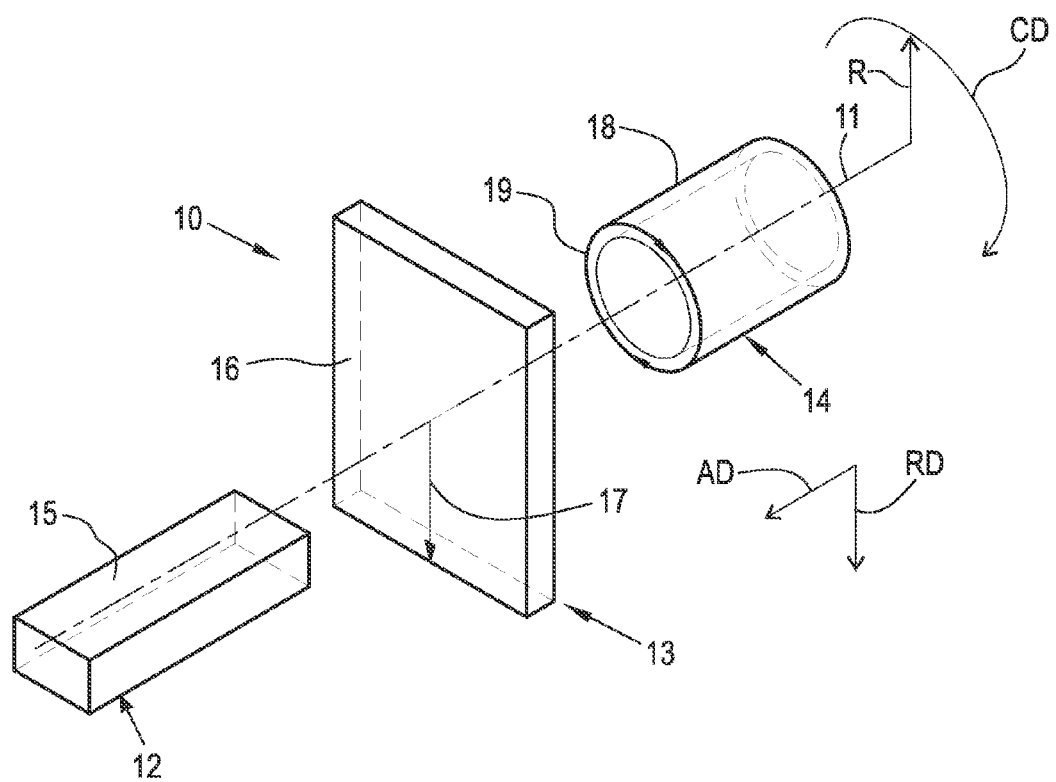
FIG. 1 is a perspective view of a cylindrical coordinate system demonstrating spatial terminology.

At the outset, it should be appreciated that like reference characters on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

By "non-rotatably connected" components we mean: any time one of the components rotates, all of the components rotate; and relative rotation between the components is not possible. Axial or radial displacement between components is possible, but not required.

FIG. 1 is a perspective view of cylindrical coordinate system 10 demonstrating spatial terminology. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
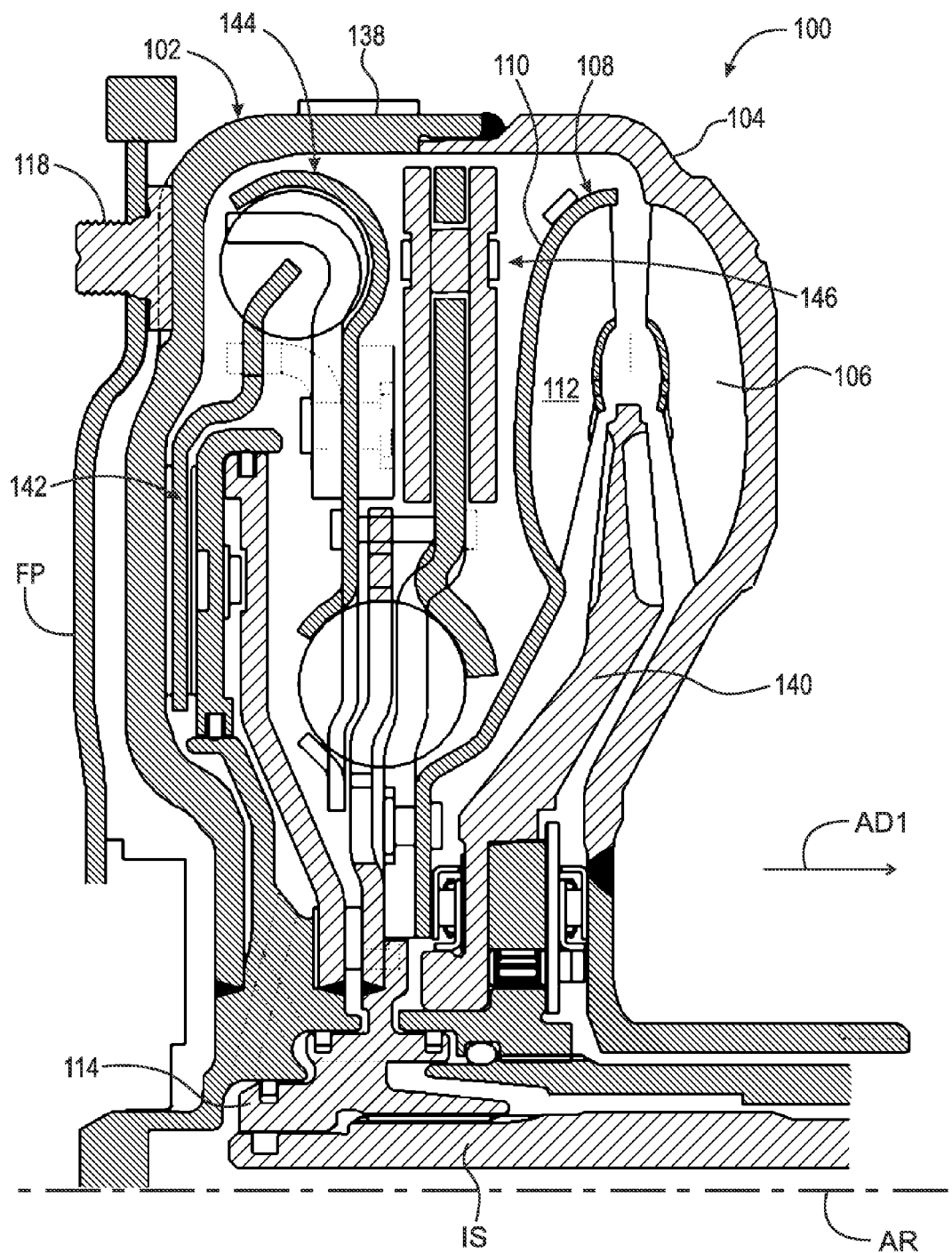
FIG. 2 is a partial cross-sectional view of a torque converter having a cover with a recessed flexplate connection.

FIG. 2 is a partial cross-sectional view of torque converter 100 having a cover with a recessed flexplate connection.

Figure 3:
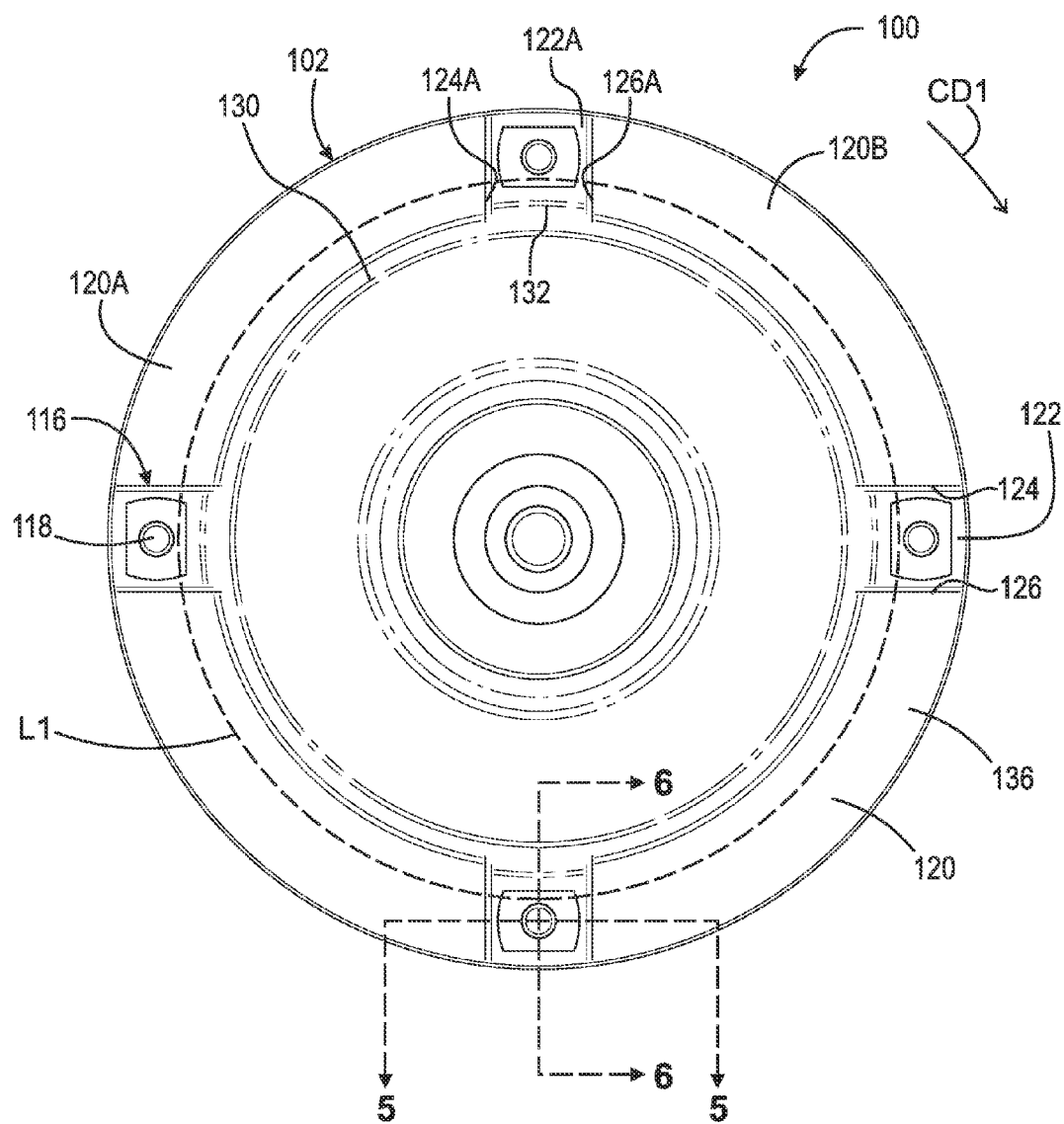
FIG. 3 is a front view of the cover shown in FIG. 2.

FIG. 3 is a front view of the cover shown in FIG. 2.

Figure 4:
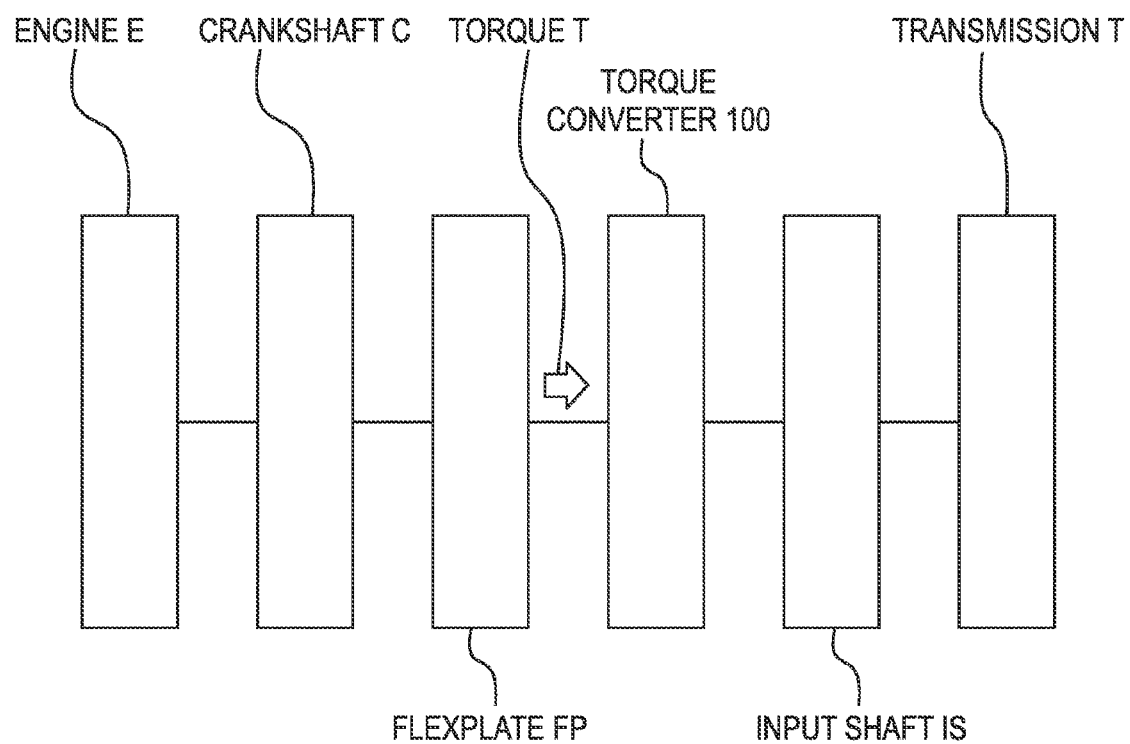
FIG. 4 is a block diagram of a drive train including the torque converter shown in FIG. 2.

FIG. 4 is a block diagram of a drive train including torque converter 100 shown in FIG. 2. The following should be viewed in light of FIG. 2 through 4. Torque converter 100 includes: axis of rotation AR; cover 102 arranged to receive torque T from engine E; impeller shell 104; at least one impeller blade 106 fixedly secured to impeller shell 104; turbine 108 including turbine shell 110 and at least one turbine blade 112 fixedly secured to turbine shell 110; and output 114 arranged to non-rotatably connect to input shaft IS for transmission T. In an example embodiment, shell 104 is fixedly secured to cover 102

Figure 5:
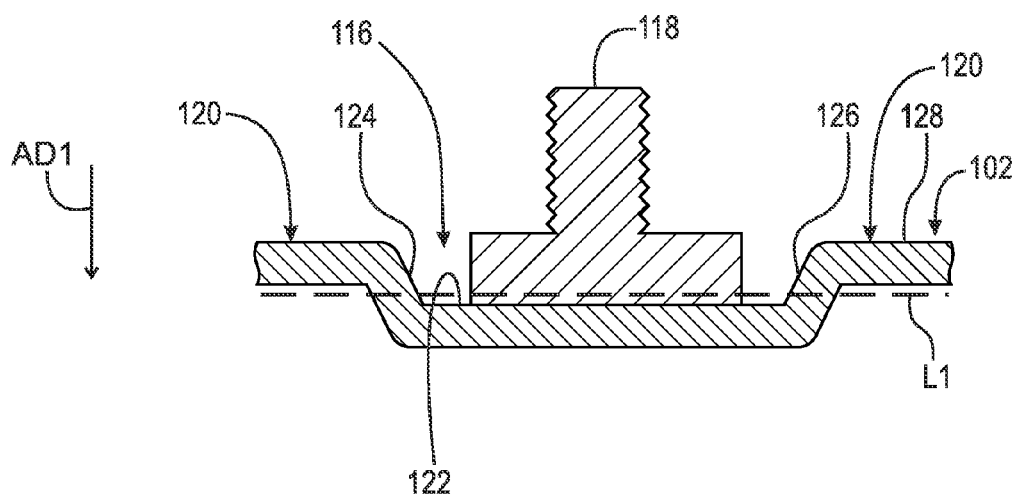
FIG. 5 is a cross-sectional view generally along line 5-5 in FIG. 3.

FIG. 5 is a cross-sectional view generally along line 5-5 in FIG. 3.

Figure 6:
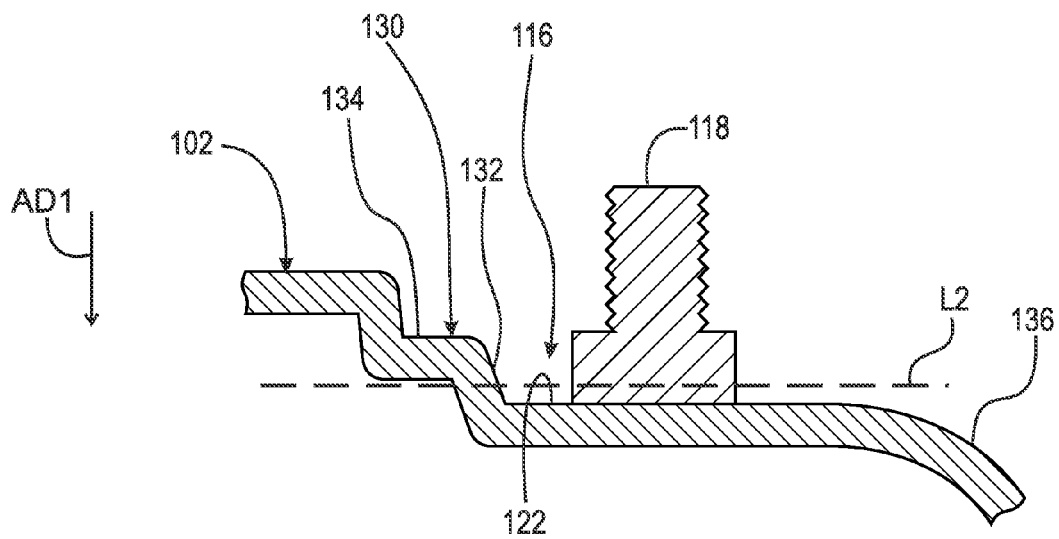
FIG. 6 is a cross-sectional view generally along line 6-6 in FIG. 3.
Figure 7:
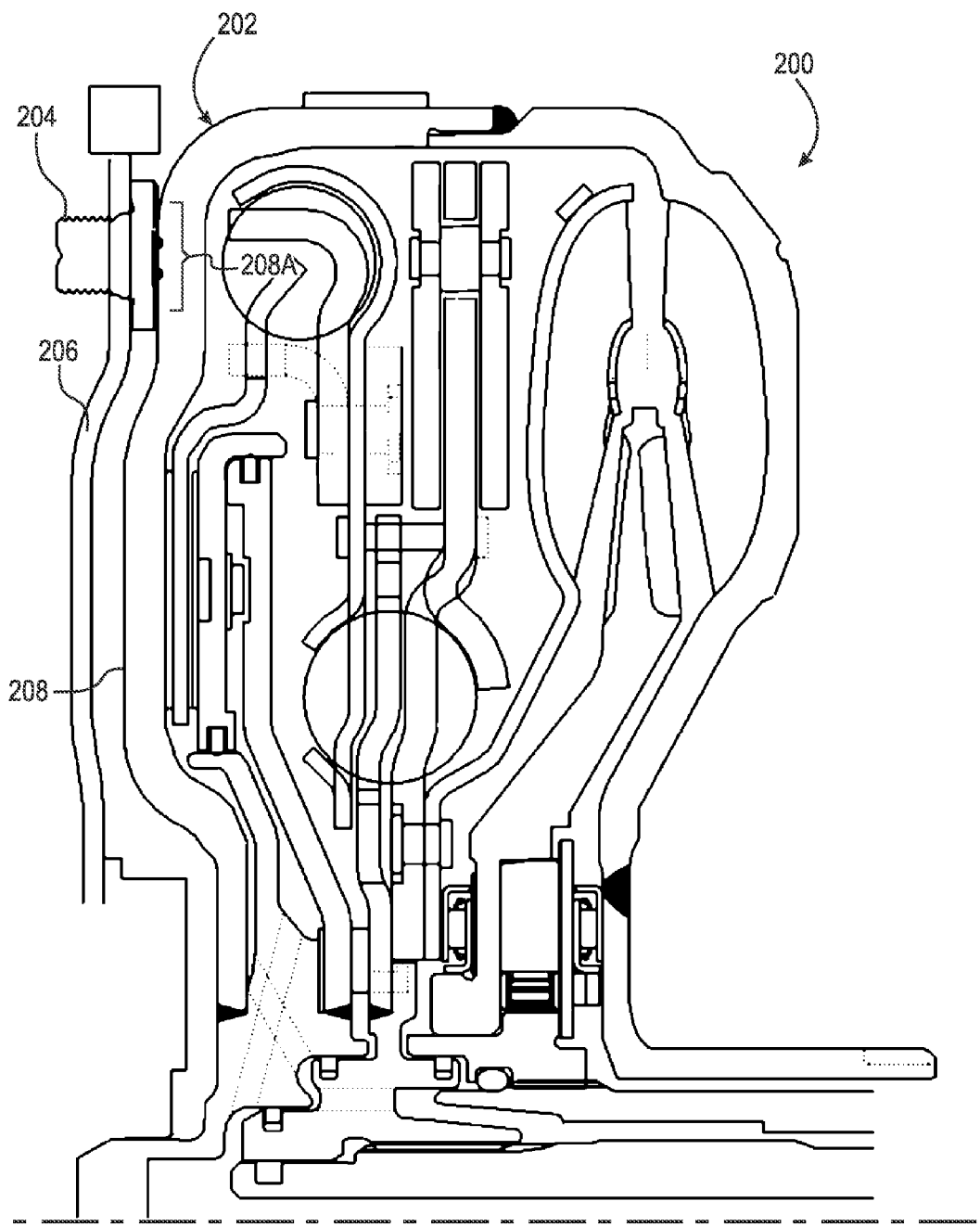
FIG. 7 is a partial cross-sectional view of a prior art torque converter.

FIG. 6 is a cross-sectional view generally along line 6-6 in FIG. 3. The following should be viewed in light of FIGS. 2 through 6. Cover 102 includes: indentations 116; and fasteners 118 located in indentations 116 and fixedly secured to cover 102. Cover 102 includes segments 120 and 122. Segments 122 extend further in axial direction AD1 than segments 120. Each indentation 116 includes: side wall 124 connecting a segment 120 with a segment 122 and side wall 126 connecting the segment 122 with another segment 120. For example, side wall 124A connects segments 120A and 122A, and side wall 126A connects segments 122A and 120B. Thus, each indentation 116 is circumferentially disposed between a pair of segments 120. Line L1, in circumferential direction CD1, is further in direction AD1 than surfaces 128 of portions 120 and passes through sidewalls 124 and 126.

In an example embodiment: cover 102 includes annular portion 130 radially inward of segments 120; each indentation 116 includes end wall 132 connecting portion 130 and segments 122; and, radial lines L2, orthogonal to axis of rotation AR and further in direction AD1 than surface 134 of portion 130, pass through end walls 132. That is, segments 122 extend further in direction AD1 than portion 130.

Cover 102 includes annular portion 136 radially outward of indentations 116 and forming a radially outermost portion of cover 102. In an example embodiment, indentations 116 are open to portion 136, for example, a smooth curve as shown in FIG. 6, without a discontinuity like an end wall, connects segments 122 and portion 136.

In an example embodiment, cover 102 includes four indentations 116. However, it should be understood that other numbers of indentations 116 are possible. In an example embodiment, fasteners 118 are lugs or studs. Fasteners 118 are arranged to receive torque T and transmit torque T to cover 102. For example, fasteners 118 are arranged to fixedly secure cover 102 to flex plate FP, which is connected to crankshaft C of engine E.

In an example embodiment, torque converter 100 includes stator 140, torque converter clutch 142, torsional vibration damper 144, and centrifugal pendulum 146.

Advantageously, torque converter 100 and cover 102 reduce the axial extent of the connection of torque converter 100 to flexplate FP, since fasteners 118 are recessed into cover 102 via indentations 116.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A torque converter, comprising:
    an axis of rotation;
    a cover arranged to receive torque from an engine, the cover including:
        a plurality of indentations; and,
        a respective fastener located in each indentation and fixedly secured to the cover;
    an impeller shell;
    at least one impeller blade fixedly secured to the impeller shell;
    a turbine including a turbine shell and at least one turbine blade fixedly secured to the turbine shell; and,
    an output arranged to non-rotatably connect to an input shaft for a transmission, wherein:
        the cover includes an annular portion radially outward of the plurality of indentations and including a radially outermost portion of the cover; and,
        said each indentation is open to the annular portion.

2. The torque converter of claim 1, wherein:
    the cover includes first and second pluralities of segments;
    said each indentation includes:
        a respective first side wall connecting a respective first segment from the first plurality of segments with a respective second segment from the second plurality of segments; and,
        a respective second side wall connecting the respective first segment with a respective third segment from the second plurality of segments; and,
    a line in a circumferential direction passes through the respective first and second sidewalls without intersecting the respective first segments.

3. The torque converter of claim 2, wherein the respective first segments extend further in an axial direction than the respective second and third segments.

4. The torque converter of claim 3, wherein the axial direction is defined as from the at least one turbine blade toward the at least one impeller blade and parallel to the axis of rotation.

5. The torque converter of claim 2, wherein:
    the cover includes an annular portion radially inward of the respective first segments;
    said each indentation includes a respective end wall connecting the annular portion and the respective first segment; and,
    a respective radial line, orthogonal to the axis of rotation, passes through each respective end wall without intersecting the respective first segment.

6. The torque converter of claim 5, wherein:
    the respective first segments extend further in an axial direction than the annular portion; and, the axial direction is defined as from the at least one turbine blade toward the at least one impeller blade and parallel to the axis of rotation.

7. The torque converter of claim 1, wherein the plurality of indentations includes four indentations.

8. The torque converter of claim 1, wherein the respective fastener is a respective lug or a respective stud.

9. The torque converter of claim 1, wherein the respective fasteners are arranged to receive the torque and transmit the torque to the cover.

10. A torque converter, comprising:
an axis of rotation;
a cover arranged to receive torque from an engine, the cover including:
a first plurality of segments;
a plurality of indentations, each indentation circumferentially disposed between respective first and second segments included in the first plurality of segments; and,
a respective fastener located in said each indentation and fixedly secured to the cover;
an impeller shell fixedly secured to the cover;
at least one impeller blade fixedly secured to the impeller shell;
a turbine including a turbine shell and at least one turbine blade fixedly secured to the turbine shell; and,
an output arranged to non-rotatably connect to an input shaft for a transmission, wherein:
said each indentation:
extends further in an axial direction, defined from the at least one turbine blade toward the at least on impeller blade and parallel to the axis of rotation, than the respective first and second segments; and,
includes a respective first side wall; and,
a line in a circumferential direction passes through the respective first sidewall without intersecting the respective first and second segments.

11. The torque converter of claim 10, wherein:
the cover includes a second plurality of segments;
the respective first side wall connects a respective third segment from the second plurality of segments with the respective first segment;
each indentation includes a respective second side wall connecting a respective fourth segment from the second plurality of segments with the respective first segment; and,
the line in the circumferential direction passes through the respective first and second sidewalls without intersecting the respective third segments.

12. The torque converter of claim 11, wherein:
the cover includes an annular portion radially inward of the plurality of indentations;
said each indentation includes a respective end wall connecting the annular portion and the respective third segment; and,
a respective radial line, orthogonal to the axis of rotation, passes through each respective end wall without intersecting the respective third segment.

13. The torque converter of claim 10, wherein the plurality of indentations includes four indentations.

14. The torque converter of claim 10, wherein the respective fastener is a respective lug or a respective stud.

15. The torque converter of claim 10, wherein the respective fasteners are arranged to receive the torque and transmit the torque to the cover.

16. A torque converter, comprising:
an axis of rotation;
a cover arranged to receive torque from an engine, the cover including:
a first plurality of segments facing in a first axial direction;
a second plurality of segments facing in the first axial direction;
a plurality of indentations, each indentation formed by:
a respective first side wall connecting a respective first segment included in the first plurality of segments with a respective second segment included in the second plurality of segments; and,
a respective second side wall connecting the respective first segment with a respective third segment included in the second plurality of segments;
an impeller shell fixedly secured to the cover;
at least one impeller blade fixedly secured to the impeller shell;
a turbine including a turbine shell and at least one turbine blade fixedly secured to the turbine shell; and,
an output arranged to non-rotatably connect to an input shaft for a transmission.

17. The torque converter of claim 16, wherein a circumferential line intersects the respective first and second side walls without intersecting the respective first segments.

18. The torque converter of claim 16, further comprising:
a respective fastener located in said each indentation and fixedly connected to the cover.

19. The torque converter of claim 16, wherein:
the first plurality of segments extend further in a second axial direction, opposite the first axial direction, than the second plurality of segments; and,
the second axial direction is defined as from the at least one turbine blade toward the at least one impeller blade and parallel to the axis of rotation.

* * * * *